(12) United States Patent
Kobayashi et al.

(10) Patent No.: US 6,695,487 B2
(45) Date of Patent: Feb. 24, 2004

(54) CONVERSION ADAPTER FOR FERRULES HAVING DIFFERENT DIAMETERS AND METHOD FOR PRODUCTION THEREOF

(75) Inventors: Masayuki Kobayashi, Miyagi-ken (JP); Takeshi Taniguchi, Sendai (JP); Hidenobu Nagahama, Kurobe (JP); Hideki Takeda, Sendai (JP); Etsuji Sugita, Tokyo (JP)

(73) Assignee: YKK Corporation, Tokyo (JP)

( * ) Notice: Subject to any disclaimer, the term of this patent is extended or adjusted under 35 U.S.C. 154(b) by 233 days.

(21) Appl. No.: 09/877,068

(22) Filed: Jun. 11, 2001

(65) Prior Publication Data

US 2002/0031310 A1 Mar. 14, 2002

(30) Foreign Application Priority Data

Jun. 14, 2000 (JP) ........................................ 2000-178828

(51) Int. Cl.[7] ................................................ G02B 6/38
(52) U.S. Cl. ........................................................ 385/70
(58) Field of Search ............................................ 385/70

(56) References Cited

U.S. PATENT DOCUMENTS 5,312,495 A * 5/1994 Masumoto et al. ......... 148/550
6,179,478 B1 * 1/2001 Shouji et al. ................ 385/70

FOREIGN PATENT DOCUMENTS

JP          A-9-90169          4/1997

* cited by examiner

*Primary Examiner*—Javaid H. Nasri
(74) *Attorney, Agent, or Firm*—Finnegan, Henderson, Farrabow, Garrett & Dunner, L.L.P

(57) ABSTRACT

A conversion adapter to be used for connecting opposed optical connector ferrules having different diameters is formed of an amorphous alloy possessing at least a glass transition region, preferably a glass transition region of not less than 30 K in temperature width. Particularly, the amorphous alloy of $M^1$—$M^2$ system or $M^1$—$M^2$—La system ($M^1$: Zr and/or Hf, $M^2$: Ni, Cu, Fe, Co, Mn, Nb, Ti, V, Cr, Zn, Al, and/or Ga, La: rare earth element) possesses a wide range of $\Delta Tx$ and thus can be advantageously used as a material for the conversion adapter. Such a conversion adapter can be manufactured with high mass-productivity by a mold casting method or molding method.

16 Claims, 7 Drawing Sheets

CONVERSION ADAPTER FOR FERRULES HAVING DIFFERENT DIAMETERS AND METHOD FOR PRODUCTION THEREOF

BACKGROUND OF THE INVENTION

1. Field of the Invention

This invention relates to conversion adapters to be used for interconnecting optical connector ferrules having different diameters and methods for the production thereof.

2. Description of the Prior Art

In an optical connector which is used to facilitate the connection and the disconnection of two optical fibers or of an optical fiber and other optical element, like the SC type optical connector, for example, the predominantly used system comprises fitting one end of an optical fiber into an axial through-hole of a ferrule and inserting two ferrules thus prepared into an alignment sleeve through the opposite ends thereof to abut end faces of the ferrules against each other.

In order to directly align and connect the two ferrules to be connected by the above-mentioned system, it is necessary to align respective axes with very high accuracy because the diameter of a core thereof is small.

The use of the sleeve for aligning the ferrules each having an optical fiber inserted and fixed therein by abutting end faces thereof against each other includes the case where the optical connector plugs having the same ferrule diameter are mutually connected and the case where the optical connector plugs having different ferrule diameters are mutually connected. As a conversion adapter (sleeve) for connecting the optical connector plugs having different ferrule diameters, heretofore, those having the structures as shown in FIG. 1 through FIG. 5 are known in the art.

The conversion adapter 1 shown in FIG. 1 is a split sleeve comprising a large diameter part 2 having a large diameter through-hole "a", into which a large diameter ferrule 10 having an optical fiber 12 inserted and fixed therein is fitted, and a small diameter part 3 formed by reducing a diameter in one end portion of the large diameter part and having a small diameter through-hole "b" into which a small diameter ferrule 11 having an optical fiber 12 inserted and fixed therein is fitted, the sleeve having a slit 4 formed in the longitudinal direction thereof so as to elastically hold the ferrules 10 and 11 having different diameters. The large diameter part and the small diameter part are integrally formed of metal or plastic.

The conversion adapter 1 shown in FIG. 2, on the other hand, is a precision sleeve having a large diameter through-hole "a" in a large diameter part 2 and a small diameter through-hole "b" in a small diameter part 3 formed in series along the axis thereof to form a step in the inside surface thereof. The large diameter part and the small diameter part are integrally formed of metal.

The conversion adapter 1 shown in FIG. 3 is a double tube type precision sleeve comprising a large diameter sleeve 2a made of metal and a small diameter sleeve 3a of metal fitted and fixed in one end part of the large diameter sleeve 2a.

The conversion adapter 1 shown in FIG. 4 is a precision sleeve of the split sleeve type comprising a large diameter split sleeve 2a of metal having a slit 4 formed in the longitudinal direction thereof and a small diameter precision sleeve 3a of metal fitted and fixed in one end part of the large diameter split sleeve 2a.

Further, Japanese Patent Application, KOKAI (Early Publication) No. (hereinafter referred to briefly as "JP-A-") 9-90169 discloses a conversion adapter 1 comprising a large diameter part 2 into which a large diameter ferrule of an optical connector plug is fitted and a small diameter part 3 into which a small diameter ferrule is fitted, the large diameter part and the small diameter part being integrally formed of a synthetic resin such as, for example, a glass fiber-reinforced synthetic resin. The adapter has the structure such that a step is formed in the inside surface at the contact point between the large diameter part and the small diameter part and a groove 5 for air leakage is formed in the inside surface of the large diameter part in the axial direction thereof, as shown in FIG. 5.

As mentioned above, metal such as phosphor bronze and plastics as mentioned in JP-A-9-90169 are heretofore used as a material for the conversion adapter to be used for interconnecting the optical connectors having different ferrule diameters.

In the case of plastics, however, since they are deficient in mechanical strength and wear resistance, the decrease in the accuracy of the axial alignment of ferrules to be connected and the deformation or the deterioration of characteristics of the adapter itself are unavoidable in the conversion adapter to which attachment and detachment of the ferrule are repeatedly performed. Moreover, plastics have the difficulty that their resistance to weather (durability against the change in temperature or humidity) is low and they lacks in the reliability of prolonged use.

On the other hand, in the case of metal such as phosphor bronze, since the machining such as cutting should be performed to obtain the complicated shape like the conversion adapter, besides the above drawbacks, it takes much time to manufacture the conversion adapter and the cost of machining is large. As a result, the obtained product is inevitably expensive.

SUMMARY OF THE INVENTION

It is, therefore, an object of the present invention to provide a highly reliable and inexpensive conversion adapter which excels in mechanical strength and wear resistance, causes only sparingly deformation and wear even by repeated attachment and detachment of ferrules, and can maintain the accuracy of the axial alignment of ferrules for a long period of time.

A further object of the present invention is to provide a method which is capable of producing such an conversion adapter with high productivity at a low cost.

To accomplish the object mentioned above, in accordance with one aspect of the present invention, there is provided a conversion adapter to be used for connecting opposed optical connector ferrules having different diameters, which adapter is characterized by being formed of an amorphous alloy possessing at least a glass transition region, preferably a glass transition region of a temperature width of not less than 30K.

In a particularly preferred embodiment, the conversion adapter is characterized by being formed of a substantially amorphous alloy having a composition represented by either one of the following general formulas (1) to (6):

$$M^1_a M^2_b Ln_c M^3_d M^4_e M^5_f \tag{1}$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (misch metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$.

$$Al_{100-g-h-i}Ln_g M^6_h M^3_i \qquad (2)$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 < h \leq 55$, and $0 \leq i \leq 10$.

$$Mg_{100-p}M^7_p \qquad (3)$$

wherein $M^7$ represents at least one element selected from the group consisting of Cu, Ni, Sn, and Zn; and p represents an atomic percentage falling in the range of $5 \leq p \leq 60$.

$$Mg_{100-q-r}M^7_q M^8_r \qquad (4)$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$.

$$Mg_{100-q-s}M^7_q M^9_s \qquad (5)$$

wherein $M^7$ represents at least one element selected from the group consisting of Cu, Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$.

$$Mg_{100-q-r-s}M^7_q M^8_r M^9_s \qquad (6)$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

Furthermore, according to another aspect of the present invention, there is also provided a method of producing the aforementioned conversion adapter for the ferrules having different diameters.

One mode of the methods is characterized by comprising the steps of melting an alloying material capable of producing an amorphous alloy in a melting vessel having an upper open end, forcibly transferring the resultant molten alloy into a forced cooling casting mold disposed above the vessel and provided with at least one molding cavity, and rapidly solidifying the molten alloy in the forced cooling casting mold to confer amorphousness on the alloy thereby obtaining the product made of an alloy containing an amorphous phase.

In a preferred embodiment of this method, the melting vessel is furnished therein with a molten metal transferring member adapted to forcibly transfer the molten alloy upward, the forced cooling casting mold is provided with at least two identically or differently shaped molding cavities and runners severally communicating with the cavities, and the runners are disposed on an extended line of a transfer line for the molten metal transferring member.

Another method is characterized by comprising the steps of providing a vessel for melting and retaining an alloying material capable of producing an amorphous alloy possessing a glass transition region, providing a mold provided with at least one cavity of the shape of the product aimed at, coupling a hole formed in, for example, the lower or upper part of the vessel with a sprue of the mold, for example by disposing the mold beneath or on the vessel, then applying pressure on a melt of the alloy in the vessel thereby enabling a prescribed amount of the melt to pass through the hole of the vessel and fill the cavity of the mold, and solidifying the melt in the mold at a cooling rate of not less than 10 K (Kelvin scale)/sec. thereby giving rise to the product of an alloy containing an amorphous phase.

In any of the methods described above, as the alloying material mentioned above, a material having a composition represented by either one of the aforementioned general formulas (1) to (6) and capable of producing a product formed of a substantially amorphous alloy containing an amorphous phase in a volumetric ratio of at least 50% is advantageously used.

Still another method of the present invention is characterized by comprising the steps of heating a material formed of a substantially amorphous alloy having a composition represented by either one of the general formulas (1) to (6) mentioned above and containing an amorphous phase in a volumetric ratio of at least 50% until the temperature of a supercooled liquid region, inserting the resultant hot amorphous material into a container held at the same temperature, coupling with the container a mold provided with a cavity of the shape of the product aimed at, and forcing a prescribed amount of the alloy in the state of a supercooled liquid into the mold by virtue of the viscous flow thereof to perform molding.

By using an amorphous alloy capable of giving a cast product with high accuracy in accordance with the present invention, the adapters satisfying the dimensional accuracy and the surface quality required of the conversion adapters for connecting ferrules having different diameters can be manufactured with high productivity at a low cost by the mold casting method or molding method. Further, since the amorphous alloy to be used for the present invention excels in strength, resistance to wear, toughness, resistance to corrosion, and other properties mentioned hereinafter, the conversion adapters manufactured from this amorphous alloy withstand long service without readily sustaining abrasion, deformation, chipping, or other similar defects and are capable of keeping the high dimensional accuracy and holding the opposed ferrules stably for a long period of time as aligned mutually to their axes, even when the ferrules are repeatedly attached to and detached from the adapter, without injuring the ferrules and without rendering the development of backlash in the state of retention of ferrules.

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

The present invention provides a method which, by the combination of the conventional technique based on the mold casing method or molding method with an amorphous alloy exhibiting a glass transition region, is enabled to produce a conversion adapter (sleeve) for the ferrules having different diameters satisfying a predetermined shape, dimensional accuracy, and surface quality in a single process with high mass-producibility and allowed to omit or diminish markedly such steps of mechanical working as grinding and the consequent inexpensive provision of a conversion adapter excelling in durability, strength, wear resistance, and elasticity expected of the conversion adapter.

That is to say, the present invention is characterized by the fact that the conversion adapter of the optical connector for abutting, aligning, and retaining opposed ferrules having different diameters is manufactured from an amorphous alloy.

The amorphous alloy manifests high tensile strength and high bending strength and excels in resistance to wear, durability, resistance to impact, surface smoothness, and other properties and, therefore, constitutes itself the optimum material for the conversion adapter which abuts the opposed optical connector ferrules having different diameters, aligns them without involving any deviation from axial alignment, and infallibly retains them. The conversion adapter which has been manufactured from the amorphous alloy possessed of such characteristic properties as described above is such that the ridges of a semicircular cross section, for example, to be formed on the inside surface thereof, therefore, do not easily injure the outside surfaces of the ferrules or do not easily develop backlash after the repetition of the attachment and detachment of the ferrules to and from the adapter but allow stable connection between the opposed ferrules having different diameters.

Further, since the amorphous alloy possesses highly accurate castability and machinability and, therefore, allows manufacture of a conversion adapter of smooth surface faithfully reproducing the contour of the cavity of the mold by the mold casting method or molding method, the conversion adapter made of an amorphous alloy permits omission of subsequent steps for adjustment of size or adjustment of surface coarseness or allows remarkable curtailment of such steps. The conversion adapter which satisfies dimensional prescription, dimensional accuracy, and surface quality, therefore, can be manufactured by a single process with high mass productivity.

Now, the present invention will be described more concretely below with reference to the attached drawings which illustrate some embodiments.

Figure 6A:
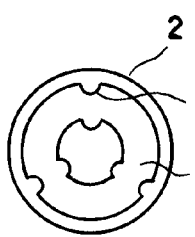
FIGS. 6A through 6C illustrates one embodiment of a conversion adapter for the ferrules having different diameters according to the present invention, FIG. 6A being a left-hand side view, FIG. 6B a longitudinal section, and FIG. 6C a right-hand side view.
Figure 6B:
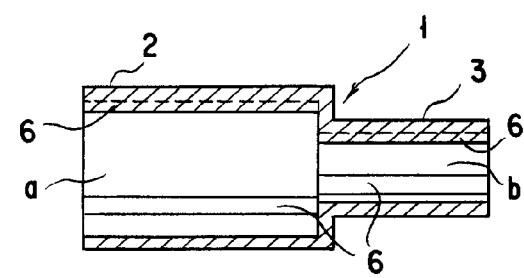
Figure 6C:
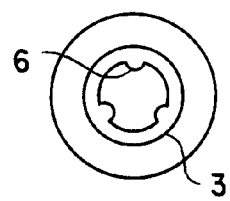

FIGS. 6A through 6C illustrates one preferred embodiment of the conversion adapter for the ferrules having different diameters, the adapter being manufactured from the amorphous alloy according to the present invention. This conversion adapter 1 comprises a large diameter part 2 having a large diameter through-hole "a" formed therein to which a large diameter ferrule (not shown) having an optical fiber inserted and fixed therein is fitted and a small diameter part 3 having a small diameter through-hole "b" formed therein to which a small diameter ferrule (not shown) similarly having an optical fiber inserted and fixed therein is fitted, the large diameter part 2 and the small diameter part 3 being integrally formed of an amorphous alloy in the connected state such that the steps are formed in the inside and outside surfaces thereof at the connection portion. Further, ridges (elongated elevations) 6 are formed on the inside surfaces of the large diameter part 2 and the small diameter part 3 respectively at three points as extended from one to the other end thereof in the longitudinal direction thereof.

The ridges 6, for the purpose of avoiding infliction of injury on the ferrules, are required to have an arcuate upper face convex toward the axis of the adapter 1 and a cross section such as, for example, a substantially semicircular cross section, a substantially semielliptic cross section, a triangular cross section containing a rounded upper end, etc. Preferably, the ridges 6 assume such a substantially semicircular cross section as is illustrated in FIGS. 6A and 6C. By having the ridges 6 of this description provided on the inside surfaces of the large diameter part 2 and the small diameter part 3 respectively at three points as extended in the longitudinal direction, the adapter 1 is enabled to retain the ferrules therein in a state nipped at three points of the ridges contacting the outside surfaces of the ferrules. As a result, the adapter 1 is capable of more accurately retaining the abutted ferrules having different diameters as mutually aligned to the axes of the ferrules (and consequently of the optical fibers being connected). Furthermore, the gaps formed by the ridges 6 function as air relief portions when the ferrules are inserted into the adapter. When the ridges have an acute upper end, however, they are at a disadvantage in suffering the upper ends to concentrate the load exerted thereon and tend to inflict injury on the outside surfaces of the ferrules. The ridges may be provided at four or more points on the inside surface of the adapter. For the purpose of avoiding deviation in the fixation of the opposed ferrules having different diameters inserted into the adapter and establishing the coincidence of the axes thereof, however, it is most preferable to form three ridges.

The ridges 6 are preferred to be disposed as equally spaced at three points on the inside surface of the adapter 1, though a slight deviation in the regular spacing is tolerable.

Though the height of the ridges 6 has only to satisfy the requirement that the ridges 6 be capable of stably retaining the ferrules, it is generally preferred to be in the range of about 0.1–1.0 mm (about 0.1–1.0 mm in radius in the case of the ridges having a semicircular cross section). While the ridges 6 are preferred to be a continued elevation, they may discontinuously extend throughout the adapter as occasion demands.

Figure 5:
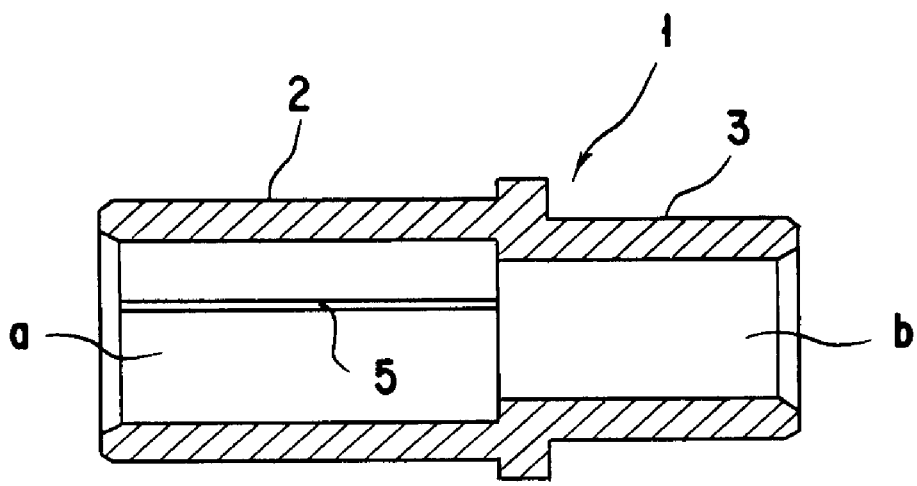
FIG. 5 is a longitudinal section of a still further example of the conventional conversion adapter.

Incidentally, it is needless to say that the adapters which do not have ridges as shown in FIG. 5 may also be manufactured from an amorphous alloy according to the present invention.

Figure 1:
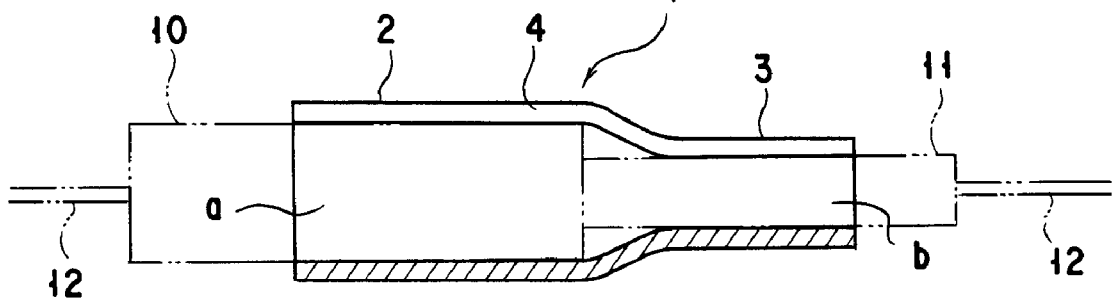
FIG. 1 is a longitudinal section of an example of the conventional conversion adapter for the ferrules having different diameters.
Figure 2:
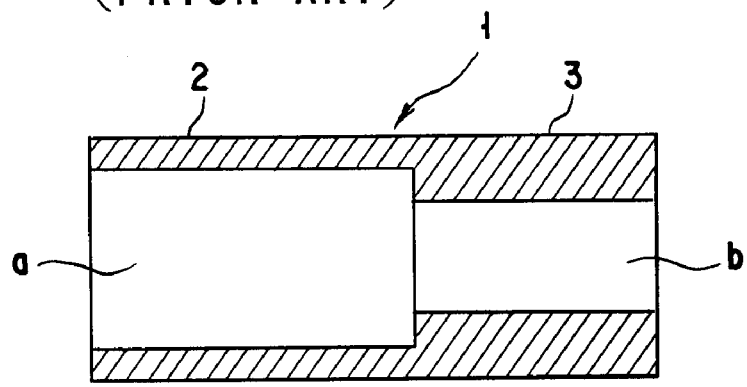
FIG. 2 is a longitudinal section of another example of the conventional conversion adapter.
Figure 3:
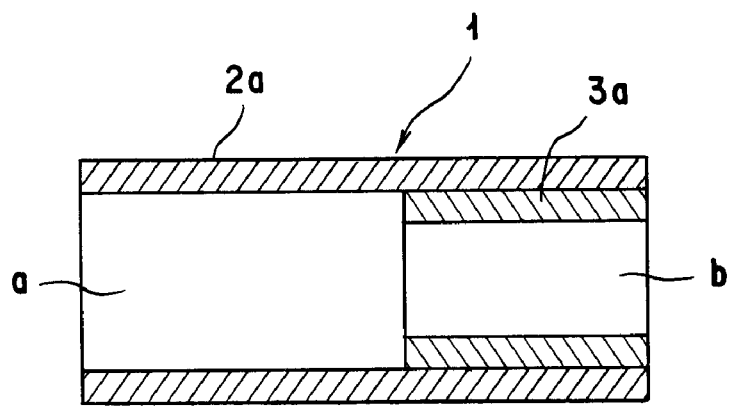
FIG. 3 is a longitudinal section of still another example of the conventional conversion adapter.
Figure 4:
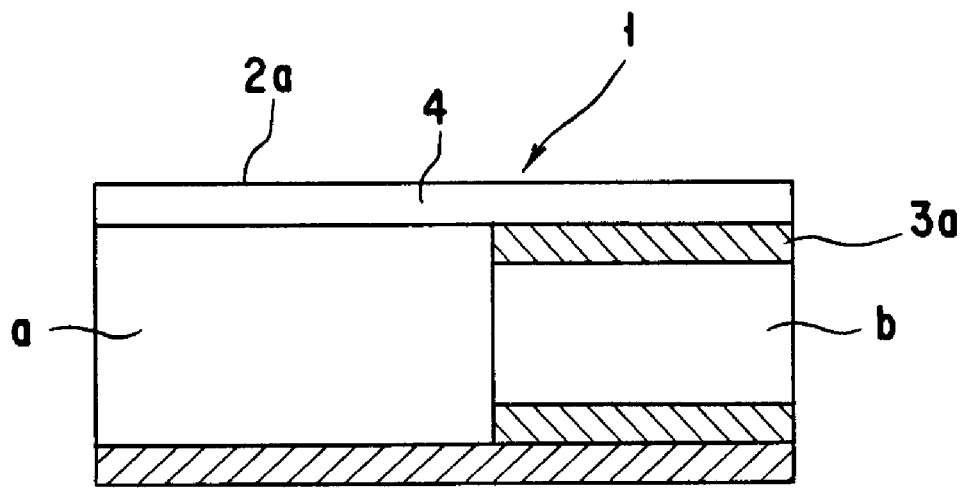
FIG. 4 is a longitudinal section of a further example of the conventional conversion adapter.
Figure 7:
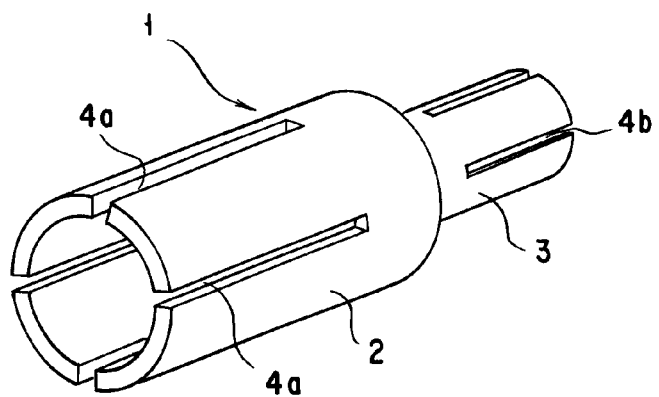
FIG. 7 is a perspective view illustrating another embodiment of the conversion adapter of the present invention.

FIG. 7 illustrates another embodiment of the conversion adapter for the ferrules having different diameters, the adapter being manufactured from the amorphous alloy according to the present invention. In this conversion adapter 1, a plurality of slits 4a and 4b are formed independently (in the embodiment shown in the drawing, four slits as being symmetrical) from an end of the large diameter part 2 to the proximity of the connection portion with the small diameter part 3 and from the opposite end of the small diameter part 3 to the proximity of the connection portion mentioned above, respectively. By providing the large diameter part 2 and the small diameter part 3 with respective independent slits 4a and 4b as mentioned above, the slits function as the air relief portions when the ferrule is inserted into the adapter and, in addition thereto, it will be easy to design the adapter so as to give to the small diameter part and to the large diameter part equal force for holding the small diameter ferrule and the large diameter ferrule. That is, when a single slit of the uniform width is formed from an end of the large diameter part 2 to the opposite end of the small diameter part 3 as shown in FIG. 1 mentioned above, it is difficult to give the same holding force to the large diameter part 2 and to the small diameter part 3 because the elastic force changes with the size of the diameter (because the large diameter part is susceptible to the elastic deformation). By providing the large diameter part 2 and the small diameter part 3 with respective independent slits 4a and 4b as mentioned above, however, it is easy to equalize the holding force by changing the widths of respective slits or by changing the number of slits. Incidentally, although four slits are formed in the large diameter part 2 and the small diameter part 3 respectively in the illustrated embodiment, one slit or two or more may be provided and its number can be changed as occasion demands.

Figure 8:
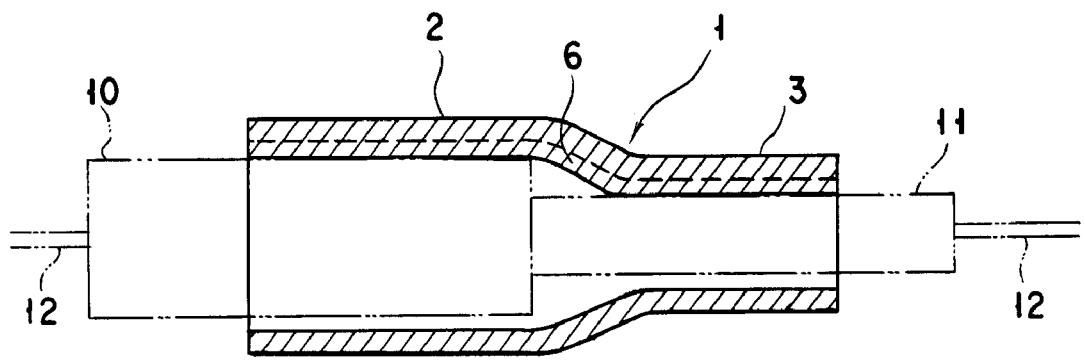
FIG. 8 is a longitudinal section illustrating still another embodiment of the conversion adapter of the present invention.

FIG. 8 illustrates still another embodiment of the conversion adapter for the ferrules having different diameters, the adapter being manufactured from the amorphous alloy according to the present invention. The conversion adapter 1 of this embodiment is formed to reduce a diameter so that the large diameter part 2 is connected and transformed to the small diameter part 3 with a gentle slope of a predetermined angle (slope). In this conversion adapter, three ridges (elongated elevations) 6 each having a substantially semicircular cross section are formed symmetrically on the inside surfaces of the large diameter part 2 and the small diameter part 3 as continuously extended in the longitudinal direction from the end of the large diameter part to the opposite end of the small diameter part. This conversion adapter 1 is also enabled to retain the inserted ferrules therein in a state nipped at three points of the ridges, as explained in connection with FIGS. 6A through 6C, and capable of more accurately retaining the abutted ferrules 10 and 11 having different diameters as mutually aligned to the axes of the ferrules (and consequently of the optical fibers 12 being connected).

Figure 9:
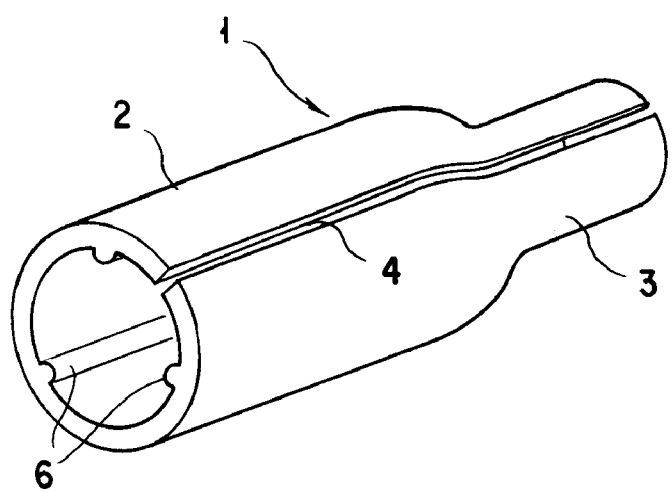
FIG. 9 is a longitudinal section illustrating a further embodiment of the conversion adapter of the present invention.

FIG. 9 illustrates a further embodiment of the conversion adapter for the ferrules having different diameters, the adapter being manufactured from the amorphous alloy according to the present invention. The conversion adapter 1 of this embodiment is formed to reduce a diameter so that the large diameter part 2 is connected and transformed to the small diameter part 3 with a gentle slope of a predetermined angle (slope), as in the embodiment shown in FIG. 8. Further, three ridges (elongate elevations) 6 each having a substantially semicircular cross section are formed symmetrically on the inside surfaces of the large diameter part 2 and the small diameter part 3 as continuously extended from the end of the large diameter part 2 to the opposite end of the small diameter part 3 in the longitudinal direction thereof, and a slit 4 is formed therein throughout the entire length from the end of the large diameter part 2 to the opposite end of the small diameter part 3 in the longitudinal direction thereof.

Even with a precision adapter which is not furnished with such a slit, the present invention attains the aforementioned effects due to the use of such an amorphous alloy as the material as mentioned above and the effects obtained by the formation of the ridges mentioned above. The provision of the slit, however, is advantageous in enhancing the elasticity of the adapter 1, enabling the adapter to nip stably the opposed ferrules elastically as aligned mutually to their axes even in the presence of more or less dispersion of dimensional accuracy, and permitting the ferrules to be repeatedly attached to and detached from the adapter without rendering the development of backlash in the state of retention of ferrules.

Figure 10:
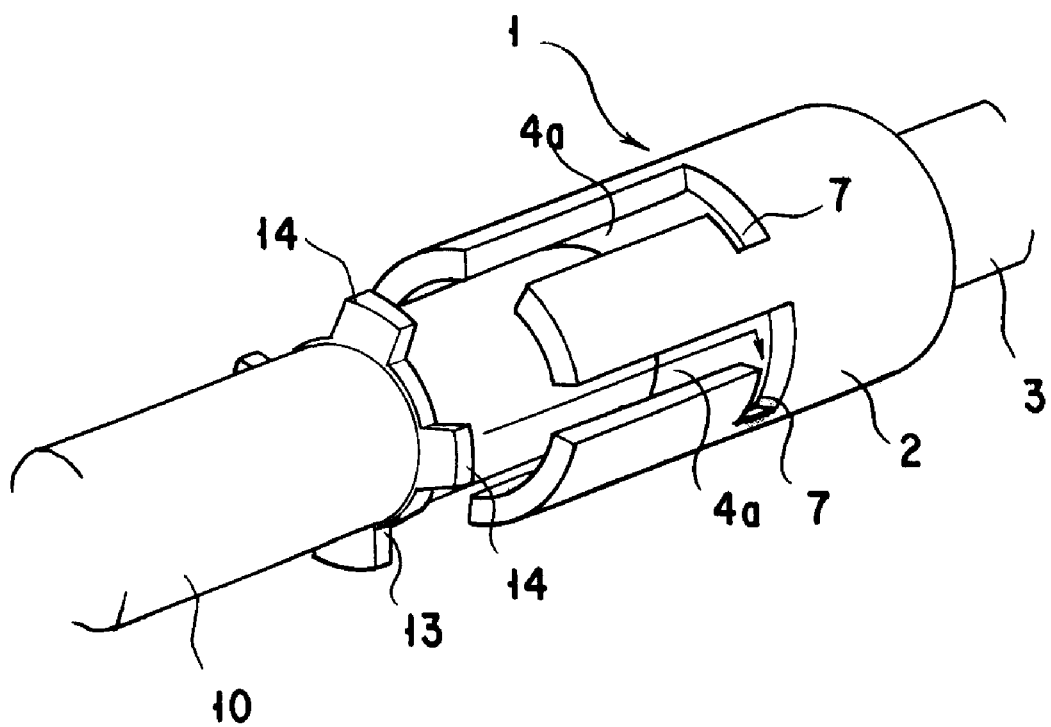
FIG. 10 is a fragmentary perspective view illustrating a still further embodiment of the conversion adapter of the present invention in the state of use.

FIG. 10 illustrates still another form of the conversion adapter for the ferrules having different diameters, the adapter being manufactured from the amorphous alloy according to the present invention. In this conversion adapter 1, a groove (or slit) 7 of a predetermined length is formed in the circumferential direction thereof in each basal end of the slits 4a formed in the large diameter part 2. Since a plurality of projections 14 are usually formed on the flange part 13 of the ferrule 10 for position alignment, by inserting the ferrule 10 into the large diameter part 2 of the conversion adapter 1 mentioned above so that the projections 14 may pass along the slits 4a, turning the ferrule 10 slightly when the projections 14 reach the basal ends of the slits 4a, and making the projections 14 engagement in the grooves 7, the ferrule 10 will be in the state locked in the conversion adapter 1. In this case, the width and the number of slits 4a may be changed according to the width of a tip part and the number of the projections 14 of the ferrule 10 to be used. Furthermore, the small diameter part side of the conversion adapter 1 may also be provided with the same locking mechanism.

Although the conversion adapters having the structures described above are manufactured from an amorphous alloy, they are preferred to manifest good mechanical properties, particularly a Young's modulus in the approximate range of 90–99 GPa and an elastic limit in the approximate range of 1% to several %. The conversion adapter of the present invention manufactured from such an amorphous alloy is excellent in elastic properties and can fully withstand the repeated attachment and detachment of ferrules.

Incidentally, the shape and the structure of the conversion adapter are not limited to the aforementioned form, and various forms can be used for them according to the ferrules having the different diameters to be used. Further, the present invention can also be applied to the conventional conversion adapters (sleeves) shown in FIG. 1 to FIG. 5 mentioned above by manufacturing them from an amorphous alloy.

Although the material for the conversion adapter for the ferrules having different diameters according to the present invention does not need to be limited to any particular substance but may be any of the materials which are capable at all of furnishing a product formed of a "substantially amorphous alloy" (this term means an alloy containing an amorphous phase in a volumetric ratio of at least 50%), the amorphous alloy having a composition represented by either one of the following general formulas (1) to (6) may be advantageously used.

$$M^1_a M^2_b Ln_c M^3_d M^4_e M^5_f \quad (1)$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (misch metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$.

The above amorphous alloy includes those represented by the following general formulas (1-a) to (1-p).

$$M^1_a M^2_b \quad (1\text{-a})$$

This amorphous alloy has large negative enthalpy of mixing and good producibility of the amorphous structure due to the coexistence of the $M^2$ element and Zr or Hf.

$$M^1_a M^2_b Ln_c \quad (1\text{-b})$$

The addition of a rare earth element to the alloy represented by the above general formula (1-a), as in this amorphous alloy, enhances the thermal stability of the amorphous structure.

$$M^1_a M^2_b M^3_d \quad (1\text{-c})$$

$$M^1_a M^2_b Ln_c M^3_d \quad (1\text{-d})$$

The filling of gaps in the amorphous structure with the $M^3$ element having a small atomic radius (Be, B, C, N, or O), as in these amorphous alloys, makes the structure stable and enhances the producibility of the amorphous structure.

$$M^1_a M^2_b M^4_e \quad (1\text{-e})$$

$$M^1_a M^2_b Ln_c M^4_e \quad (1\text{-f})$$

$$M^1_a M^2_b M^3_d M^4_e \quad (1\text{-g})$$

$$M^1_a M^2_b Ln_c M^3_d M^4_e \quad (1\text{-h})$$

The addition of a high melting metal, $M^4$ (Ta, W, or Mo) to the above alloys, as in these amorphous alloys, enhances the heat resistance and corrosion resistance without affecting the producibility of the amorphous structure.

$$M^1_a M^2_b M^5_f \quad (1\text{-i})$$

$$M^1_a M^2_b Ln_c M^5_f \quad (1\text{-j})$$

$$M^1_a M^2_b M^3_d M^5_f \quad (1\text{-k})$$

$$M^1_a M^2_b Ln_c M^3_d M^5_f \quad (1\text{-l})$$

$$M^1_a M^2_b M^4_e M^5_f \quad (1\text{-m})$$

$$M^1_a M^2_b Ln_c M^4_e M^5_f \quad (1\text{-n})$$

$$M^1_a M^2_b M^3_d M^4_e M^5_f \quad (1\text{-o})$$

$$M^1_a M^2_b Ln_c M^3_d M^4_e M^5_f \quad (1\text{-p})$$

These amorphous alloys containing a noble metal, $M^5$ (Au, Pt, Pd, or Ag) will not be brittle even if the crystallization occurs.

$$Al_{100-g-h-i} Ln_g M^6_h M^3_i \quad (2)$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 < h \leq 55$, and $0 \leq i \leq 10$.

The above amorphous alloy includes those represented by the following general formulas (2-a) and (2-b).

$$Al_{100-g-h} Ln_g M^6_h \quad (2\text{-a})$$

This amorphous alloy has large negative enthalpy of mixing and good producibility of the amorphous structure.

$$Al_{100-g-h-i} Ln_g M^6_h M^3_i \quad (2\text{-b})$$

This amorphous alloy has a stable structure and enhanced producibility of the amorphous structure due to the filling of gaps in the amorphous structure with the $M^3$ element having a small atomic radius (Be, B, C, N, or O).

$$Mg_{100-p} M^7_p \quad (3)$$

wherein $M^7$ represents at least one element selected from the group consisting of Cu, Ni, Sn, and Zn; and p represents an atomic percentage falling in the range of $5 \leq p \leq 60$.

This amorphous alloy has large negative enthalpy of mixing and good producibility of the amorphous structure.

$$Mg_{100-q-r} M^7_q M^8_r \quad (4)$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$.

The filling of gaps in the amorphous structure of the alloy of the above general formula (3) with the $M^8$ element having a small atomic radius (Al, Si, or Ca), as in this amorphous alloy, makes the structure stable and enhances the producibility of the amorphous structure.

$$Mg_{100-q-s} M^7_q M^9_s \quad (5)$$

$$Mg_{100-q-r-s} M^7_q M^8_r M^9_s \quad (6)$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

The addition of a rare earth element to the alloy of the general formula (3) or (4) mentioned above, as in these amorphous alloys, enhances the thermal stability of the amorphous structure.

Among other amorphous alloys mentioned above, the Zr-TM-Al and Hf-TM-Al (TM: transition metal) amorphous alloys having very wide differences between the glass transition temperature (Tg) and the crystallization temperature (Tx) exhibit high strength and high corrosion resistance, possess wide supercooled liquid ranges (glass transition ranges), ΔTx=Tx−Tg, of not less than 30 K, and extremely wide supercooled liquid ranges of not less than 60 K in the case of the Zr-TM-Al amorphous alloys. In the above temperature ranges, these amorphous alloys manifest very satisfactory workability owing to viscous flow even at such low stress not more than some tens MPa. They are characterized by being produced easily and very stably as evinced by the fact that they are enabled to furnish an amorphous bulk material even by a casting method using a cooling rate of the order of some tens K/s. After a further study in search of uses for these alloys, the inventors have ascertained that by the mold casting from melt and by the molding process utilizing the viscous flow resorting to the glass transition range as well, these alloys produce amorphous materials and permit very faithful reproduction of the shape and size of a molding cavity of a mold and, with the physical properties of the alloys as a contributory factor, befit the conversion adapter for interconnecting the ferrules having different diameters.

The Zr-TM-Al and Hf-TM-Al amorphous alloys to be used in the present invention possess very large range of ΔTx, though variable with the composition of alloy and the method of determination. The $Zr_{60}Al_{15}Co_{2.5}Ni_{7.5}Cu_{15}$ alloy (Tg: 652K, Tx: 768K), for example, has such an extremely wide ΔTx as 116 K. It also offers very satisfactory resistance to oxidation such that it is hardly oxidized even when it is heated in the air up to the high temperature of Tg. The Vickers hardness (Hv) of this alloy at temperatures from room temperature through the neighborhood of Tg is 460 (DPN), the tensile strength thereof is 1,600 MPa, and the bending strength thereof is up to 3,000 MPa. The thermal expansion coefficient, α of this alloy from room temperature through the neighborhood of Tg is as small as $1 \times 10^{-5}$/K, the Young's modulus thereof is 91 GPa, and the elastic limit thereof in a compressed state exceeds 4–5%. Further, the toughness of the alloy is high such that the Charpy impact value falls in the range of 6–7 $J/cm^2$. This alloy, while exhibiting such properties of very high strength as mentioned above, has the flow stress thereof lowered to the neighborhood of 10 MPa when it is heated up to the glass transition range thereof. This alloy, therefore, is characterized by being worked very easily and being manufactured with low stress into minute parts and high-precision parts complicated in shape. Moreover, owing to the properties of the so-called glass (amorphous) substance, this alloy is characterized by allowing manufacture of formed (deformed) articles with surfaces of extremely high smoothness and having substantially no possibility of forming a step which would arise when a slip band appeared on the surface as during the deformation of a crystalline alloy.

Generally, an amorphous alloy begins to crystallize when it is heated to the glass transition range thereof and retained therein for a long time. In contrast, the aforementioned alloys which possess such a wide ΔTx range as mentioned above enjoy a stable amorphous phase and, when kept at a temperature properly selected in the ΔTx range, avoid producing any crystal for a duration up to about two hours. The user of these alloys, therefore, does not need to feel any anxiety about the occurrence of crystallization during the standard molding process.

The aforementioned alloys manifest these properties unreservedly during the course of transformation thereof from the molten state to the solid state. Generally, the manufacture of an amorphous alloy requires rapid cooling. In contrast, the aforementioned alloys allow easy production of a bulk material of a single amorphous phase from a melt by the cooling which is effected at a rate of about 10 K/s. The solid bulk material consequently formed also has a very smooth surface. The alloys have transferability such that even a scratch of the order of microns inflicted by the polishing work on the surface of a mold is faithfully reproduced.

When the aforementioned alloys are adopted as a material for the conversion adapter for the ferrules having different diameters, therefore, the mold to be used for producing the formed article is only required to have the surface thereof adjusted to fulfill the surface quality expected of the conversion adapter because the molded product faithfully reproduces the surface quality of the mold. In the conventional mold casting method, therefore, these alloys allow the steps for adjusting the size and the surface roughness of the molded article to be omitted or diminished.

The characteristics of the aforementioned amorphous alloys including in combination relatively low hardness, high tensile strength, high bending strength, relatively low Young's modulus, high elastic limit, high impact resistance, high wear resistance, smoothness of surface, and highly accurate castability render these alloys appropriate for use as the material for the conversion adapter. They even allow these alloys to be molded for mass production by the conventional molding method.

As a material to be used for the production of the conversion adapter according to the present invention, any amorphous alloys heretofore known in the art such as, for example, amorphous alloys disclosed in JP-10-186176, JP-10-311923, JP-11-104281, and JP-11-189855 may be used besides the amorphous alloys mentioned above.

Then, some preferred embodiments of the method for manufacturing the conversion adapter of the present invention will be described with reference to the drawings.

Figure 11:
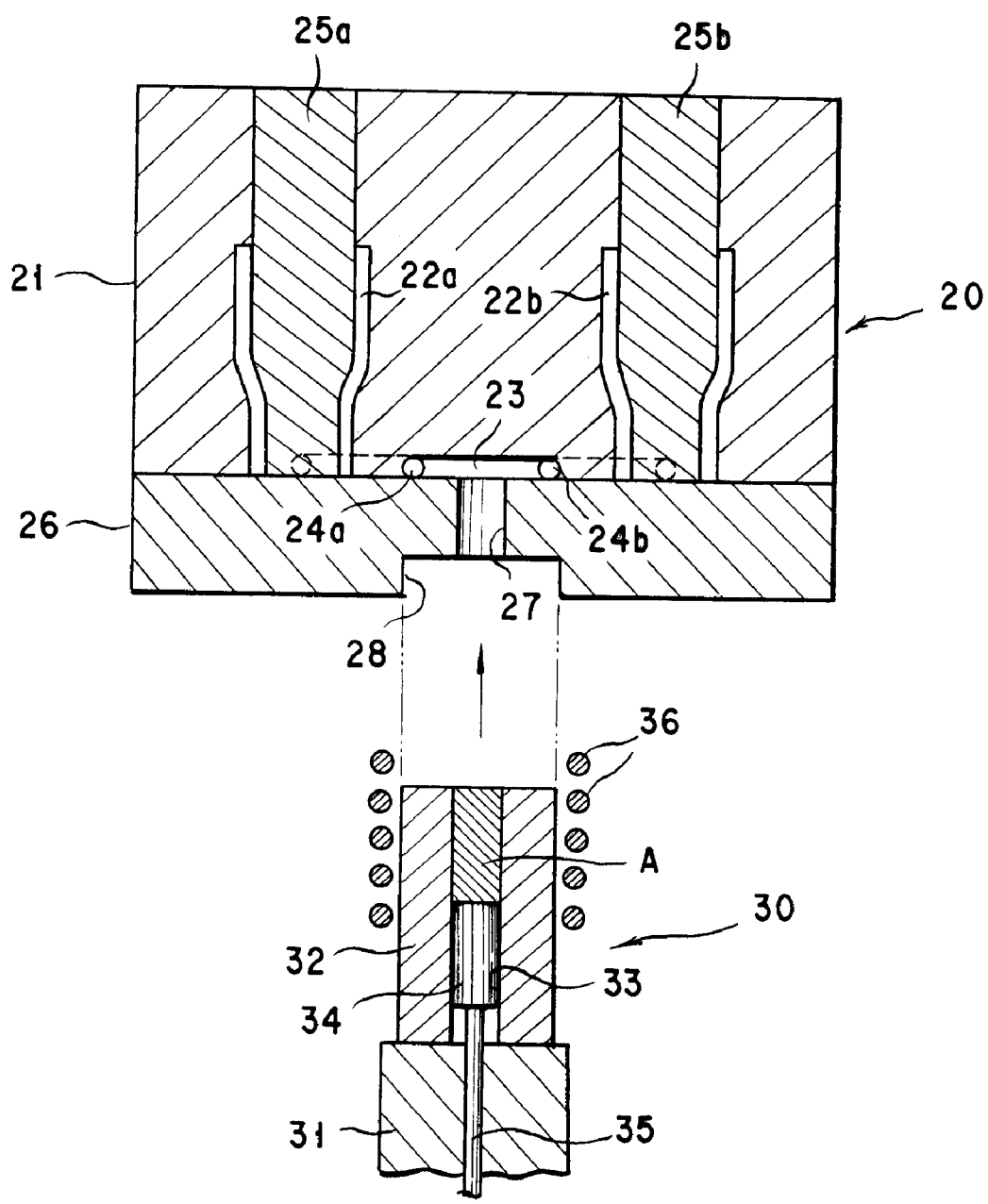
FIG. 11 is a fragmentary section schematically illustrating one embodiment of the apparatus to be used for the production of the conversion adapter of the present invention.

FIG. 11 schematically illustrates one mode of embodying an apparatus and method for the production of the conversion adapter of the present invention by the mold casting technique.

A forced cooling casting mold 20 is a split mold composed of an upper mold 21 and a lower mold 26. The upper mold 21 has a pair of molding cavities 22a, 22b formed therein and adapted to define the outside dimension of an adapter. Inside these cavities 22a, 22b, cores 25a, 25b for defining the inside dimension of the adapter are disposed respectively. These cavities 22a, 22b intercommunicate through the medium of a runner 23 such that the molten metal flows through the leading ends of such parts 24a, 24b of the runner as half encircle the peripheries of the cavities 22a, 22b at a prescribed distance into the cavities 22a, 22b. On the other hand, a sprue (through-hole) 27 communicating with the runner 23 mentioned above is formed at a pertinent position of the lower mold 26. Underneath the sprue 27 is formed a depression 28 which is shaped to conform with an upper part of a cylindrical raw material accommodating part or pot 32 of a melting vessel 30.

The cores 25a, 25b, when necessary, may be formed integrally with the lower mold 26. (In this case, however, the vertical positional relation of the large diameter part and the small diameter part is reversed.) While the forced cooling casting mold 20 can be made of such metallic material as copper, copper alloy, cemented carbide or superalloy, it is preferred to be made of such material as copper or copper alloy which has a large thermal capacity and high thermal conductivity for the purpose of heightening the cooling rate of the molten alloy poured into the cavities 22a, 22b. The upper mold 21 may have disposed therein such a flow channel as allow flow of a cooling medium like cooling water or cooling gas.

The melting vessel 30 is provided in the upper part of a main body 31 thereof with the cylindrical raw material accommodating part 32 and is disposed directly below the sprue 27 of the lower mold 26 mentioned above in such a manner as to be reciprocated vertically. In a raw material accommodating hole 33 of the raw material accommodating part 32, a molten metal transferring member or piston 34 having nearly the same diameter as the raw material accommodating hole 33 is slidably disposed. The molten metal transferring member 34 is vertically moved by a plunger 35 of a hydraulic cylinder (or pneumatic cylinder) not shown in the diagram. An induction coil 36 as a heat source is disposed so as to encircle the raw material accommodating part 32 of the melting vessel 30. As the heat source, any arbitrary means such as one resorting to the phenomenon of resistance heating may be adopted besides the high-frequency induction heating. The material of the raw material accommodating part 32 and that of the molten metal transferring member 34 are preferred to be such heat-resistant material as ceramics or metallic materials coated with a heat-resistant film.

Incidentally, for the purpose of preventing the molten alloy from forming an oxide film, it is preferred to dispose the apparatus in its entirety in a vacuum or an atmosphere of an inert gas such as Ar gas or establish a stream of an inert gas at least between the lower mold 26 and the upper part of the raw material accommodating part 32 of the melting vessel 30.

The production of the adapter of the present invention is effected by first setting the melting vessel 30 in a state separated downwardly from the forced cooling casting mold 20 and then charging the empty space overlying the molten metal transferring member 34 inside the raw material accommodating part 32 with the alloying raw material "A" of a composition capable of yielding such an amorphous alloy as mentioned above. The alloying raw material "A" to be used may be in any of the popular forms such as rods, pellets, and minute particles.

Subsequently, the induction coil 36 is excited to heat the alloying raw material "A" rapidly. After the fusion of the alloying raw material "A" has been confirmed by detecting the temperature of the molten metal, the induction coil 36 is demagnetized and the melting vessel 30 is elevated until the upper end thereof is inserted in the depression 28 of the lower mold 26. Then, the hydraulic cylinder is actuated to effect rapid elevation of the molten metal transferring member 34 through the medium of the plunger 35 and injection of the molten metal through the sprue 27 of the forced cooling casting mold 20. The injected molten metal is advanced through the runner 23 introduced into the cavities 22a, 22b and compressed and rapidly solidified therein. In this case, the cooling rate exceeding $10^3$ K/s can be obtained by suitably setting such factors as injection temperature and injection speed, for example. Thereafter, the melting vessel 30 is lowered and the upper mold 21 and the lower mold 26 are separated to allow extraction of the product.

The conversion adapters possessed of a smooth surface faithfully reproducing the cavity surface of the casting mold are obtained by severing runner parts from the adapter parts of a cast product and grinding the cut faces of the adapter parts remaining after by the severance.

The high-pressure die casting method described above allows a casting pressure up to about 100 MPa and an injection speed up to about several m/s and enjoys the following advantages.

(1) The charging of the mold with the molten metal completes within several milliseconds and this quick charging adds greatly to the action of rapid cooling.

(2) The highly close contact of the molten metal to the mold adds to the speed of cooling and allows precision molding of molten metal as well.

(3) Such faults as shrinkage cavities possibly occurring during the shrinkage of a cast article due to solidification can be allayed.

(4) The method allows manufacture of a formed article in a complicated shape.

(5) The method permits smooth casting of a highly viscous molten metal.

Figure 12:
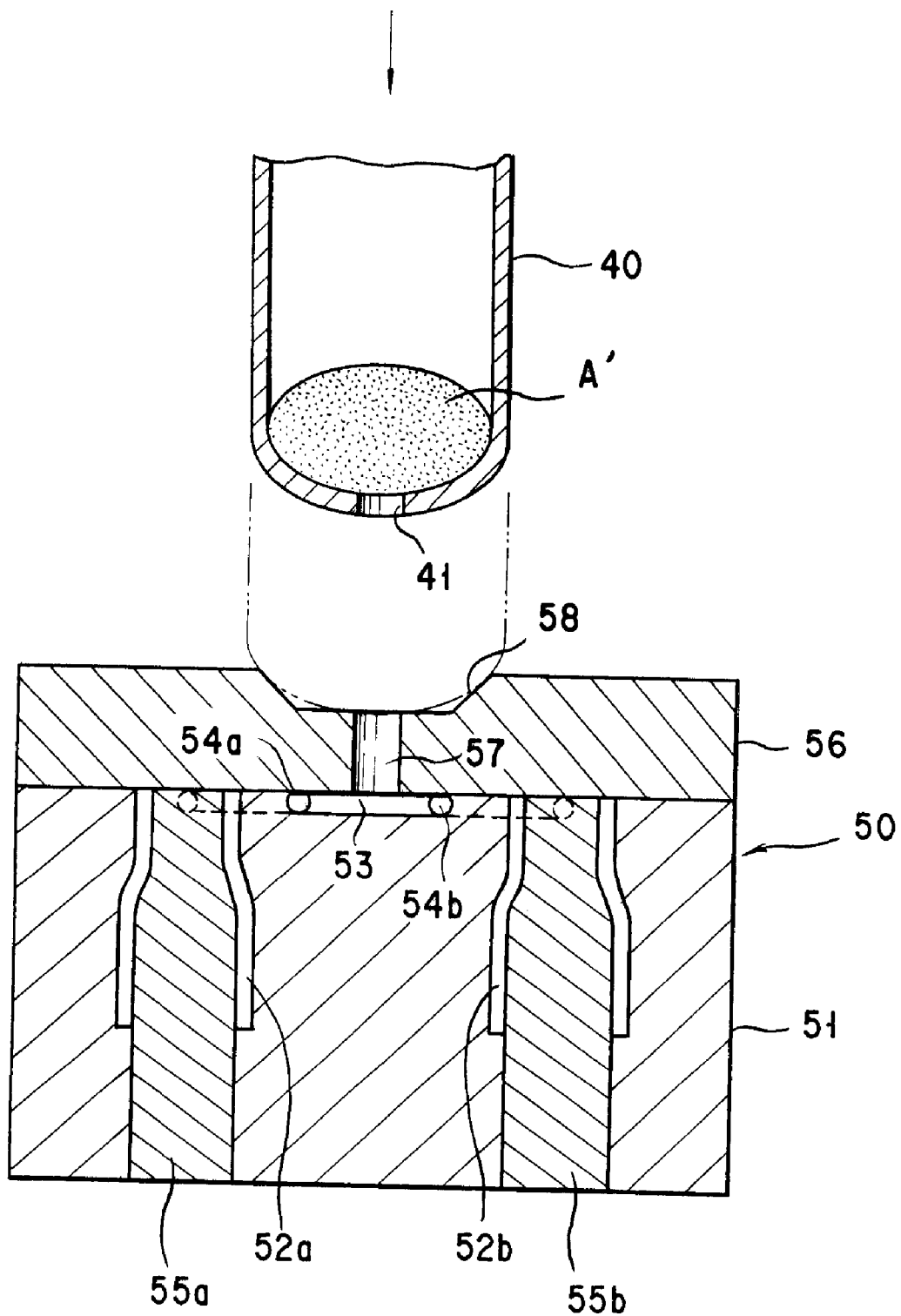
FIG. 12 is a fragmentary section schematically illustrating another embodiment of the apparatus to be used for the production of the conversion adapter of the present invention.

FIG. 12 illustrates schematically the construction of another mode of embodying the apparatus and method for producing the conversion adapter of the present invention.

In FIG. 12, the reference numeral 40 denotes a vessel for melting an alloying material capable of producing such an amorphous alloy as mentioned above and holding the produced melt therein. Beneath this vessel 40 is disposed a split mold 50 having cavities 52a, 52b of the shape of a product aimed at. Any of such known heating means (not shown) as, for example, the high-frequency induction heating and the resistance heating may be adopted for heating the vessel 40.

The construction of the mold 50 is substantially identical with the forced cooling casting mold 20 illustrated in FIG. 11 mentioned above except that the vertical positional relation is reversed. Specifically, an upper mold 56 has formed in the upper part of a sprue (through-hole) 57 a depression 58 for accommodating the lower end part of the vessel 40 and corresponds to the lower mold 26 shown in FIG. 11. Meanwhile, a lower mold 51 is identical with the upper mold 21 shown in FIG. 11 except that molding cavities 52a, 52b, runners 53, 54a, 54b, and cores 55a, 55b have their shapes and modes of disposition reversed from those of FIG. 11. In this mold 50, too, the cores 55a, 55b may be formed integrally with the upper mold 56. (In this case, however, the vertical positional relation of the large diameter part and the small diameter part is reversed.)

The production of the conversion adapters are carried out by connecting a small hole 41 formed in the bottom part of the vessel 40 to the sprue 57 of the mold 50, applying pressure to the molten alloy A' in the vessel 40 through the medium of inert gas introduced into the vessel, for example, thereby forwarding a prescribed amount of the molten alloy A' from the small hole 41 in the bottom of the vessel 40 through the runners 53, 54a, and 54b into the cavities 52a, 52b until these cavities are filled with the molten alloy A' to capacity, and solidifying the molten alloy at a cooling rate preferably exceeding 10 K/s to obtain the conversion adapter made of an alloy consisting substantially of an amorphous phase.

By the methods described above, the conversion adapter can be produced which manifests a dimensional accuracy, L, in the range of ±0.0005–0.001 mm and a surface accuracy in the range of 0.2 to 0.4 μm.

The methods described above manufacture two cast products by a single process using a mold provided with a pair of molding cavities. Naturally, the present invention can manufacture three or more cast products by using a mold provided with three or more cavities therein.

Besides the alloy casting method described above, the extrusion molding is also available for the manufacture of the conversion adapter. Since the amorphous alloy mentioned above possesses a large supercooled liquid region ΔTx, the conversion adapter can be obtained in a prescribed shape by heating a material of this amorphous alloy to a temperature in the supercooled liquid region, inserting the hot material in a container held at the same temperature, connecting this container to the mold provided with the cavity(ies) of the shape of a conversion adapter aimed at, pressing a prescribed amount of the heated alloy into the cavity(ies) by virtue of the viscous flow of the supercooled liquid, and molding the alloy.

While certain specific embodiments have been disclosed herein, the invention may be embodied in other specific forms without departing from the spirit or essential characteristics thereof. The described embodiments are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

The disclosure in Japanese Patent Application No. 2000-178828 of Jun. 14, 2000 is incorporated here by reference. This Japanese Patent Application describes the invention described hereinabove and claimed in the claims appended hereinbelow and provides the basis for a claim of priority for the instant invention under 35 U.S.C. 119.

What is claimed is:

1. A conversion adapter to be used for connecting opposed optical connector ferrules having different diameters, comprising a large diameter part and a small diameter part integrally formed with the large diameter part, said adapter being formed of a substantially amorphous alloy having a composition represented by either one of the following general formulas (1) to (6):

$$M^1_a M^2_b Ln_c M^3_d M^4_e M^5_f \quad (1)$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (misch metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$, $$Al_{100-g-h-i} Ln_g M^6_h M^3_i \quad (2)$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Go, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 \leq h \leq 55$, and $0 \leq i \leq 10$, $$Mg_{100-p} M^7_p \quad (3)$$

wherein $M^7$ represents at least one element selected from the group consisting of Cu, Ni, Sn, and Zn; and p represents an atomic percentage falling in the range of $5 \leq p \leq 60$, $$Mg_{100-q-r} M^7_q M^8_r \quad (4)$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $\leq 1 \leq r \leq 25$, $$Mg_{100-q-s} M^7_q M^9_s \quad (5)$$

wherein $M^7$ represents at least one element selected from the group consisting of Cu, Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$, and $$Mg_{100-q-r-s} M^7_q M^8_r M^9_s \quad (6)$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

2. The conversion adapter according to claim 1, wherein said adapter has three ridges formed on inside surfaces of said large diameter part and said small diameter part respectively, each of said ridges having an upper face assuming an arcuate cross section which curves toward an axis of said adapter.

3. The conversion adapter according to claim 2, wherein each of said ridges has a substantially semicircular cross section.

4. The conversion adapter according to claim 2, wherein each of said ridges continuously or discontinuously extends the entire length of said large diameter part and said small diameter part.

5. The conversion adapter according to claim 2, wherein each of said ridges has a height of about 0.1 to about 1.0 mm.

6. The conversion adapter according to claim 1, wherein said adapter has a slit formed throughout the entire length of said large diameter part and said small diameter part in the longitudinal direction thereof.

7. The conversion adapter according to claim 1, wherein each of said large diameter part and said small diameter part has at least one slit separated from each other and formed in the longitudinal direction thereof.

8. The conversion adapter according to claim 7, wherein at least one of said large diameter part and said small diameter part has a groove formed in a basal portion of said slit.

9. The conversion adapter according to claim 1, wherein said adapter is formed of an amorphous alloy possessing a glass transition region of a temperature width of not less than 30 K.

10. A method for the production of a conversion adapter to be used for connecting opposed optical connector ferrules having different diameters, comprising a large diameter part and a small diameter part integrally formed with the large diameter part, said adapter being formed of an amorphous alloy possessing at least a glass transition region, comprising the steps of:

provsiding a melting vessel having an upper open end;

providing a forced cooling casting mold provided with at least one molding cavity and disposed above said melting vessel;

melting an alloying material capable of yielding an amorphous alloy in said melting vessel;

forcibly transferring the resultant molten alloy into the molding cavity of said forced cooling casting mold; and rapidly solidifying said molten alloy in said forced cooling casting mold to confer amorphousness on the alloy thereby obtaining a cast product of an alloy containing an amorphous phase, wherein said alloying material has a composition represented by either one of the following general formulas (1) through (6) to obtain the product formed of a substantially amorphous alloy containing an amorphous phase in a volumetric ratio of at least 50%:

$$M^1_a M^2_b Ln_c M^3_d M^4_e M^5_f \tag{1}$$

wherein $M^1$ represents either or both of the two elements. Zr and Hf: $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (misch metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq e \leq 15$, and $0 \leq f \leq 15$, $$Al_{100-g-h-i} Ln_g M^6_h M^3_i \tag{2}$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; M3 represents at least one element selected from the group consisting of Be, B, C, N, and O; and g, h, and i represent such atomic percentages as respectively satisfy $30 \leq g \leq 90$, $0 \leq h \leq 55$, and $0 \leq i \leq 10$, $$Mg_{100-p} M^7_p \tag{3}$$

wherein $M^7$ represents at least one element selected from the group consisting of Cu, Ni, Sn, and Zn; and p represents an atomic percentage falling in the range of $5 \leq p \leq 60$, $$Mg_{100-q-r} M^7_q M^8_r \tag{4}$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$, $$Mg_{100-q-s} M^7_q M^9_s \tag{5}$$

wherein $M^7$ represents at least one element selected from the group consisting of Cu, Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$, and $$Mg_{100-q-r-s} M^7_q M^8_r M^9_s \tag{6}$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

11. The method according to claim 10, wherein said melting vessel has a molten metal transferring member disposed in the vessel and adapted to forcibly transfer the molten alloy upward, and said forced cooling casting mold is provided with at least two identically or differently shaped molding cavities and runners communicating with said cavities, said runners being disposed on an extended line of a transfer line for the molten metal transferring member.

12. The method according to claim 11, wherein said molten metal transferring member is caused to transfer forcibly the molten alloy in said melting vessel into the molding cavities of said forced cooling casting mold and meanwhile exert pressure on said molten alloy filling the molding cavities of said forced cooling casting mold.

13. The method according to claim 10, wherein said forced cooling casting mold is a water-cooled casting mold or gas-cooled casting mold.

14. The method according to claim 10, wherein said melting of said alloying material in said melting vessel is carried out in a vacuum or under an atmosphere of inert gas.

15. A method for the production of a conversion adapter to be used for connecting opposed optical connector ferrules having different diameters, comprising a large diameter part and a small diameter part integrally formed with the larae diameter part said adapter being formed of an amorphous alloy possessing at least a glass transition region, comprising the steps of:

providing a vessel for melting an alloying material capable of producing an amorphous alloy possessing a glass transition region, said vessel being provided with a hole and retaining a melt of said alloying material;

providing a mold provided with a sprue and at least one cavity of the shape of a product aimed at;

connecting said hole formed in said vessel to the sprue of said mold;

applying pressure on said melt in the vessel to introduce a prescribed amount of said melt via the hole of said vessel into said mold thereby filling said cavity with said melt; and solidifying said melt in said mold at a cooling rate of not less than 10 K/s to obtain a product of an alloy containing an amorphous phase, wherein said alloying material has a composition represented by either one of the following general formulas (1) through (6) to obtain the product formed of a substantially amorphous alloy containing an amorphous phase in a volumetric ratio of at least 50%:

$$M^1_a M^2_b Ln_c M^3_d M^4_e M^5_f \tag{1}$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (misch metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$, $$Al_{100-g-h-i}Ln_g M^6_h M^3_i \tag{2}$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 < h \leq 55$, and $023\ i \leq 10$, $$Mg_{100-p}M^7_p \tag{3}$$

wherein $M^7$ represents at least one element selected from the group consisting of Cu, Ni, Sn, and Zn and p represents an atomic percentage falling in the range of $5 \leq p \leq 60$, $$Mghd\ 100-q-rM^7_q M^8_r \tag{4}$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$, $$Mg_{100-q-s}M^7_q M^9_s \tag{5}$$

wherein $M^7$ represents at least one element selected from the group consisting of Cu, Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$, and $$Mg_{100-q-r-s}M^7_q M^8_r M^9_s \tag{6}$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and g, r, and s represent such atomic percentages as respectively satisfy $1 \leq q \leq 35$, $1 \leq r \leq 25$, and $3 \leq s \leq 25$.

16. A method for the production of a conversion adapter to be used for connecting opposed optical connector ferrules having different diameters, comprising a large diameter part and a small diameter part integrally formed with the large diameter part, said adapter being formed of an amorphous alloy possessing at least a glass transition region, comprising the steps of:

heating a material formed of a substantially amorphous alloy having a composition represented by either one of the following general formulas (1) to (6) and containing an amorphous phase in a volumetric ratio of at least 50% to a temperate of a supercooled liquid region;

$$M^1_a M^2_b Ln_c M^3_d M^4_e M^5_f \tag{1}$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (misch metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$, $$Al_{100-g-h-i}Ln_g M^6_h M^3_i \tag{2}$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represent at least one element selected from the group consisting of Be, B, C, N, and O; and g, h, and i, represents such atomic percentages as respectively satisfy $30 \leq g \leq 90$, $0 < h \leq 55$, and $0 \leq i \leq 10$, $$Mg_{100-p}M^7_p \tag{3}$$

wherein $M^7$ represents at least one element selected from the group consisting of Cu, Ni, Sn, and Zn; and p represents an atomic percentage falling in the range of $5 \leq p \leq 60$, $$Mg_{100-q-r}M^7_q M^8_r \tag{4}$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$, $$Mg_{100-q-s}M^7_q M^9_s \tag{5}$$

wherein $M^7$ represents at least one element selected from the group consisting of Cu, Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$, and $$Mg_{100-q-r-s}M^7_q M^8_r M^9_s \tag{6}$$

wherein $M^7$ represents at least one element selected from the group consisting of Cu, Ni, Sn, and Zn; $M^8$ represents at least one element selected from the group consisting of Al, Si, and Ca; $M^9$ at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$;

inserting the resultant hot amorphous material in a container held at the same temperature;

connecting a mold provided with a cavity of the shape of a product aimed at to said container; and introducing a prescribed amount of said alloy under pressure into said mold by virtue of the viscous flow of said supercooled liquid to form a conversion adapter.

* * * * *

UNITED STATES PATENT AND TRADEMARK OFFICE
CERTIFICATE OF CORRECTION

PATENT NO. : 6,695,487 B2
APPLICATION NO. : 09/877068
DATED : February 24, 2004
INVENTOR(S) : Masayuki Kobayashi et al.

It is certified that error appears in the above-identified patent and that said Letters Patent is hereby corrected as shown below:

On the title page, item (74), in the name of the Firm, "Farrabow," should read --Farabow,--.

In claim 1, column 15, line 54, "$Al_{100-g-h-i}Ln_g M^6{}_h M^3{}_i$" should read --$Al_{100-g-h-i}Ln_g M^6{}_h M^3{}_i$--.

In claim 1, column 15, line 60, "Go," should read --Co,--.

In claim 1, column 15, line 65, "$0 \leq h \leq 55$," should read --$0 < h \leq 55$,--.

In claim 1, column 16, line 6, "$Mg_{100-q-r}M^7 M^8{}_r$" should read --$Mg_{100-q-r}M^7{}_q M^8{}_r$--.

In claim 1, column 16, line 12, "$\leq 1 \leq r \leq 25$," should read --$1 \leq r \leq 25$,--.

In claim 10, column 17, line 24, "elements." should read --elements,--.

In claim 10, column 17, line 25, "Hf:" should read --Hf;--.

In claim 10, column 17, lines 37-38, "$0 \leq c \leq 30, 0 \leq e \leq 15$," should read --$0 \leq c \leq 30, 0 \leq d \leq 30, 0 \leq e \leq 15$,--.

In claim 10, column 17, line 40, "$Al_{100-g-h-i}Ln_g M^6{}_h M^3{}_i$" should read --$Al_{100-g-h-i}Ln_g M^6{}_h M^3{}_i$--.

In claim 10, column 17, line 46, "M3" should read --$M^3$--.

In claim 10, column 17, line 50, "$0 \leq h \leq 55$," should read --$0 < h \leq 55$,--.

In claim 10, column 17, line 63, "A1," should read --Al,--.

In claim 10, column 18, line 13, "A1," should read --Al,--.

In claim 15, column 18, line 42, "part said" should read --part, said--.

In claim 15, column 18, line 51, "at;" should read --at:--.

In claim 15, column 19, line 5, "A1," should read --Al,--.

UNITED STATES PATENT AND TRADEMARK OFFICE
CERTIFICATE OF CORRECTION

PATENT NO.        : 6,695,487 B2
APPLICATION NO. : 09/877068
DATED              : February 24, 2004
INVENTOR(S)      : Masayuki Kobayashi et al.

It is certified that error appears in the above-identified patent and that said Letters Patent is hereby corrected as shown below:

In claim 15, column 19, line 18, "$Al1_{100-g-h-i}Ln_gM^6{}_hM^3{}_i$," should read --$Al_{100-g-h-i}Ln_gM^6{}_hM^3{}_i$--.

In claim 15, column 19, line 28, "$023\ i \leqq 10$," should read --$0 \leqq i \leqq 10$,--.

In claim 15, column 19, line 36, "Mghd $100\text{-}q\text{-}rM^7{}_qM^8{}_r$," should read --$Mg_{100-q-r}M^7{}_qM^8{}_r$--.

In claim 15, column 19, line 41, "A1," should read --Al,--.

In claim 15, column 19, line 59, "A1," should read --Al,--.

In claim 15, column 19, line 61, "and g," should read --and q,--.

In claim 16, column 20, line 8, "temperate" should read --temperature--.

In claim 16, column 20, line 28, "$Al1_{100-g-h-i}Ln_gM^6{}_hM^3{}_i$," should read --$Al_{100-g-h-i}Ln_gM^6{}_hM^3{}_i$--.

In claim 16, column 20, line 35, "$M^3$ represent" should read --$M^3$ represents--.

In claim 16, column 20, line 37, "represents such" should read --represent such--.

In claim 16, column 20, line 53, "A1," should read --Al,--.

In claim 16, column 21, line 4, "A1," should read --Al,--.

UNITED STATES PATENT AND TRADEMARK OFFICE
CERTIFICATE OF CORRECTION

PATENT NO. : 6,695,487 B2
APPLICATION NO. : 09/877068
DATED : February 24, 2004
INVENTOR(S) : Masayuki Kobayashi et al.

It is certified that error appears in the above-identified patent and that said Letters Patent is hereby corrected as shown below:

In claim 16, column 21, line 4, "$M^9$ at" should read --$M^9$ represents at--.

In claim 16, column 22, line 4, "at to said" should read --at said--.

Signed and Sealed this

Twenty-seventh Day of May, 2008

JON W. DUDAS
*Director of the United States Patent and Trademark Office*